(12) United States Patent
Grover

(10) Patent No.: US 11,134,293 B2
(45) Date of Patent: *Sep. 28, 2021

(54) SEQUENTIALLY OVERLAYING MEDIA CONTENT

(71) Applicant: Roku, Inc., San Jose, CA (US)

(72) Inventor: Matthew Grover, Draper, UT (US)

(73) Assignee: Roku, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/399,401

(22) Filed: Apr. 30, 2019

(65) Prior Publication Data

US 2019/0261032 A1 Aug. 22, 2019

Related U.S. Application Data

(63) Continuation of application No. 15/842,750, filed on Dec. 14, 2017, now Pat. No. 10,334,286, which is a
(Continued)

(51) Int. Cl.
*H04N 21/2668* (2011.01)
*G06F 16/71* (2019.01)
(Continued)

(52) U.S. Cl.
CPC ......... *H04N 21/2668* (2013.01); *G06F 16/71* (2019.01); *G06F 16/74* (2019.01);
(Continued)

(58) Field of Classification Search
CPC ......... H04N 21/2668; H04N 21/23418; H04N 21/23109; H04N 21/23424;
(Continued)

(56) References Cited

U.S. PATENT DOCUMENTS 8,908,573 B1 12/2014 Wang et al.
9,113,195 B1 8/2015 Barton
(Continued)

FOREIGN PATENT DOCUMENTS

CN 103229515 A 7/2013

OTHER PUBLICATIONS

International Search Report and Written Opinion for PCT/US2016/053996 dated Dec. 15, 2016. (12 pp.).
(Continued)

*Primary Examiner* — Jefferey F Harold
*Assistant Examiner* — Alexander Boyd
(74) *Attorney, Agent, or Firm* — McDonnell Boehnen Hulbert & Berghoff LLP

(57) ABSTRACT

A method, system, or device to determine when media content has been displayed. The method can include receiving a unique identifier (UID) and fingerprint for a media segment. The method can also include determining a media segment ID for the media segment, generating and submitting a query for the media segment ID in a record database, determining that the media segment ID is not stored in the record database, and identifying an overlay content segment ID. The method can include generating and submitting for the overlay content segment ID in the record database, determining it is not stored in an entry, sending the overlay content segment to the electronic device, and receiving a notification from the electronic device.

19 Claims, 8 Drawing Sheets

Related U.S. Application Data continuation of application No. 15/130,823, filed on Apr. 15, 2016, now Pat. No. 9,848,214.

(60) Provisional application No. 62/235,811, filed on Oct. 1, 2015, provisional application No. 62/235,856, filed on Oct. 1, 2015.

(51) Int. Cl.

| | | |
|---|---|---|
| *G06F 16/74* | (2019.01) | |
| *G06F 16/783* | (2019.01) | |
| *H04N 21/234* | (2011.01) | |
| *H04N 21/8352* | (2011.01) | |
| *H04N 21/231* | (2011.01) | |
| *H04N 21/235* | (2011.01) | |
| *H04N 21/462* | (2011.01) | |
| *H04N 21/81* | (2011.01) | |
| *H04N 21/84* | (2011.01) | |
| *H04N 21/845* | (2011.01) | |

(52) U.S. Cl.
CPC ....... *G06F 16/783* (2019.01); *H04N 21/2353* (2013.01); *H04N 21/23109* (2013.01); *H04N 21/23418* (2013.01); *H04N 21/23424* (2013.01); *H04N 21/4622* (2013.01); *H04N 21/812* (2013.01); *H04N 21/8352* (2013.01); *H04N 21/84* (2013.01); *H04N 21/8456* (2013.01)

(58) Field of Classification Search
CPC ........... H04N 21/2353; H04N 21/4622; H04N 21/812; H04N 21/8352; H04N 21/84; H04N 21/8456; G06F 16/71; G06F 16/74; G06F 16/783
See application file for complete search history.

(56) References Cited

U.S. PATENT DOCUMENTS

| | | | | |
|---|---|---|---|---|
| 10,460,342 | B1* | 10/2019 | Jacobs, II | ........ G06Q 30/0251 |
| 2002/0138734 | A1 | 9/2002 | David et al. | |
| 2004/0003398 | A1* | 1/2004 | Donian | ........... H04N 21/4314 |
| | | | | 725/34 |
| 2006/0294244 | A1 | 12/2006 | Naqvi et al. | |
| 2007/0100701 | A1 | 5/2007 | Boccon-Gibod et al. | |
| 2007/0157220 | A1 | 7/2007 | Cordray et al. | |
| 2007/0168517 | A1 | 7/2007 | Weller et al. | |
| 2008/0028064 | A1* | 1/2008 | Goyal | ................... G06Q 30/02 |
| | | | | 709/224 |
| 2008/0208606 | A1 | 8/2008 | Allsop et al. | |
| 2008/0262912 | A1 | 10/2008 | Gargi | |
| 2008/0270373 | A1* | 10/2008 | Oostveen | ......... H04N 21/23109 |
| 2009/0178083 | A1 | 7/2009 | White et al. | |
| 2010/0251289 | A1 | 9/2010 | Agarwal | |
| 2010/0255890 | A1 | 10/2010 | Mikkelsen et al. | |
| 2010/0269128 | A1 | 10/2010 | Gordon | |
| 2010/0306808 | A1 | 12/2010 | Neumeier et al. | |
| 2011/0225417 | A1 | 9/2011 | Maharajh et al. | |
| 2012/0017236 | A1 | 1/2012 | Stafford et al. | |
| 2012/0096264 | A1 | 4/2012 | Traversat et al. | |
| 2012/0185905 | A1 | 7/2012 | Kelley | |
| 2012/0316934 | A1 | 12/2012 | Zier et al. | |
| 2013/0205321 | A1 | 8/2013 | Sinha et al. | |
| 2013/0290503 | A1* | 10/2013 | Rajkumar | ............. H04L 69/329 |
| | | | | 709/223 |
| 2014/0013374 | A1 | 1/2014 | Oh et al. | |
| 2014/0031960 | A1* | 1/2014 | Hill | ........... G06F 3/165 |
| | | | | 700/94 |
| 2014/0109152 | A1 | 4/2014 | Christensen et al. | |
| 2014/0229969 | A1 | 8/2014 | Gharaat et al. | |
| 2014/0282670 | A1 | 9/2014 | Sinha et al. | |
| 2014/0282671 | A1 | 9/2014 | McMillan | |
| 2014/0359656 | A1 | 12/2014 | Banica et al. | |
| 2015/0221336 | A1 | 8/2015 | Deen et al. | |
| 2015/0235267 | A1 | 8/2015 | Steube et al. | |
| 2015/0281776 | A1 | 10/2015 | Desai et al. | |
| 2015/0363823 | A1* | 12/2015 | Placentra, II | ...... G06Q 30/0246 |
| | | | | 705/14.45 |
| 2016/0286283 | A1 | 9/2016 | Oku | |
| 2017/0026718 | A1 | 1/2017 | Yabu | |
| 2017/0034555 | A1 | 2/2017 | Cox | |
| 2018/0210612 | A1 | 7/2018 | Lyubich | |

OTHER PUBLICATIONS

International Search Report and Written Opinion for PCT/US2016/053997 dated Jan. 26, 2017. (10 pp.).

\* cited by examiner

SEQUENTIALLY OVERLAYING MEDIA CONTENT

CROSS REFERENCE TO RELATED APPLICATIONS

This U.S. patent application is a continuation of, and claims priority under 35 U.S.C. § 120 from U.S. patent application Ser. No. 15/842,750, filed on Dec. 14, 2017, which is a continuation of, and claims priority under 35 U.S.C. § 120 from U.S. patent application Ser. No. 15/130,823, filed on Apr. 15, 2016, which claims priority under 35 U.S.C. § 119(e) to U.S. Provisional Application 62/235,811, filed Oct. 1, 2015 and U.S. Provisional Application No. 62/235,856, filed Oct. 1, 2015. The disclosures of these prior applications are considered part of the disclosure of this application and are hereby incorporated by reference in their entireties.

BACKGROUND

Media consumption devices, such as smart televisions (TVs), may access broadcast digital content and receive data, such as streaming media, from data networks. Streaming media refers to a service in which an end user may request media content, such as movies or news, over a telephone line, a cable channel, an Internet channel, and so forth. For example, a user may view a movie without having to leave their residence. In addition, users may access various types of educational content, such as video lectures, without having to physically attend a class at a school or an educational institution.

As the number of media consumption devices continues to increase, video content generation and delivery may similarly increase. With an increase in use of media consumption devices that access the broadcast digital content and the streaming media, content providers or network providers may distribute contextually relevant material to viewers that are consuming the broadcast digital content or the streaming media. For example, local broadcasters may include contextually relevant advertisements and interactive content with the broadcast digital content or the streaming media.

DESCRIPTION OF DRAWINGS

The disclosure will be understood more fully from the detailed description given below and from the accompanying drawings of various embodiments of the disclosure. The drawings, however, are not to be taken to limit the disclosure to the specific embodiments, but are for explanation and understanding only.

DETAILED DESCRIPTION

Figure 1:
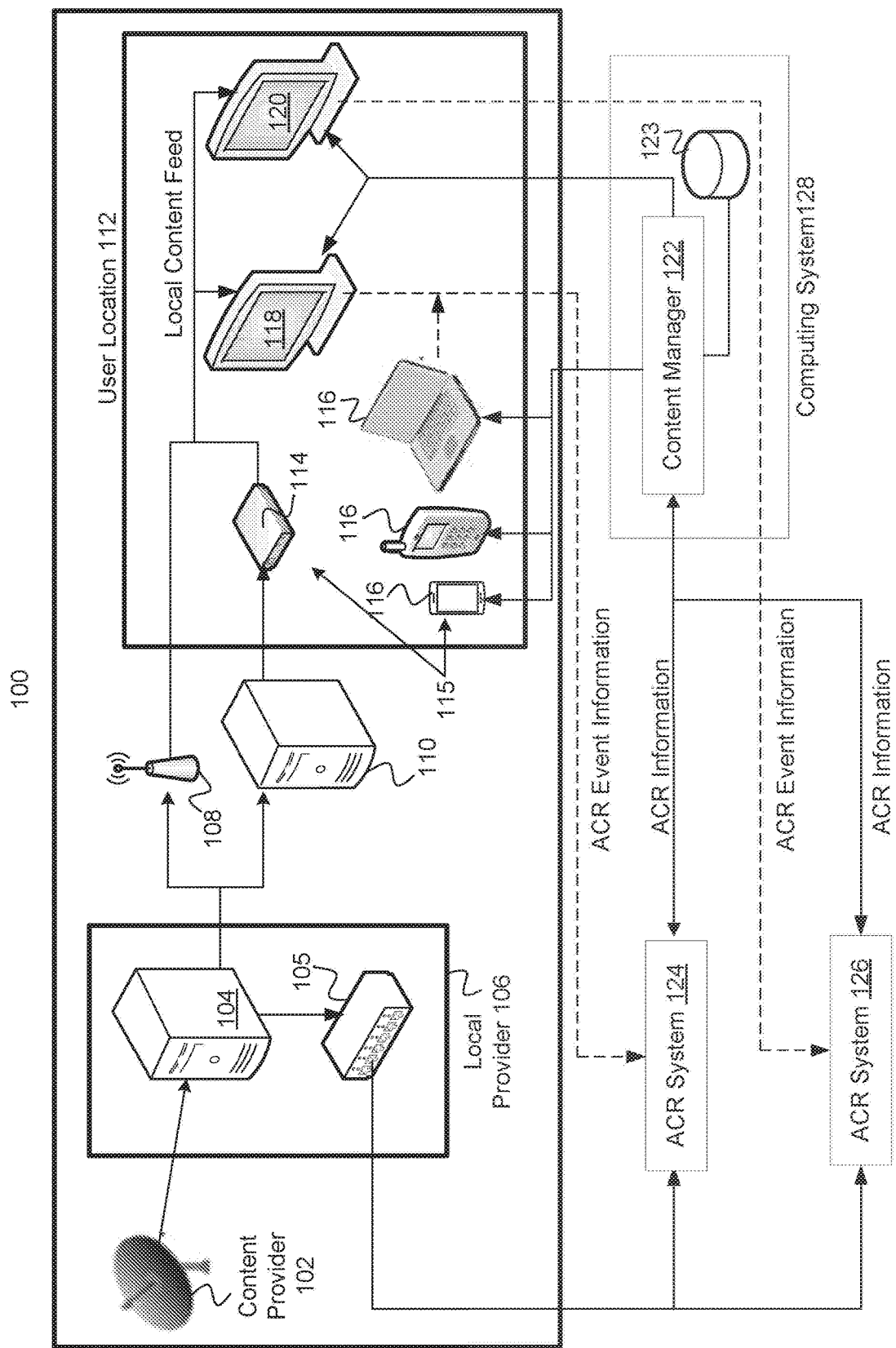
FIG. 1 illustrates a system diagram of a content distribution network according to one embodiment.

Currently, there are several hundred program choices offered by cable television (TV) providers and satellite providers. In addition, there are over one hundred major television market areas with dozens of local television channels. A content provider or broadcaster may generate content feeds at a central location and distribute the content feeds to a variety of locations. For example, a content provider may distribute a television channel to a number of network providers. The network providers can be local broadcasters, multi-channel networks, and other content owners or distributors.

The word "content" can refer to media or multimedia. The word "content" can also be a specific term that means the subject matter of the medium rather than the medium itself. Likewise, the word "media" and some compound words that include "media" (e.g. multimedia, hypermedia) are instead referring to content, rather than to the channel through which the information is delivered to the end user/audience. An example of a type of content commonly referred to as a type of media is a "motion picture," referred to as "a film." Another example is a "video," which typically includes video frames and audio samples.

Media content broadcasting or streaming, such as TV show or internet broadcast, may be an engaging venue to advertise products and services, provide information to viewers, or any combination thereof. To create revenue to provide numerous programming choices, content providers (such as television networks) can insert advertisements (ADs) into media content. Conventionally, advertisers have relied on sending one video stream to all the viewers of a channel, with the only targeting being performed by the local broadcasters based on an audience analysis and ratings providers, such as ratings provided by The Nielsen Company®.

Broadcasters, content providers, and advertisers want to know what programs or channels individual viewers are watching. The broadcasters, content providers, and advertisers may also want to know when the individual viewers are watching the programs or channels. The broadcasters, content providers, and advertisers can use this information to target subject matter and a timing of ADs or commercials to viewers. For example, broadcasters want to target ADs and other non-commercial information to specific viewers. Non-commercial may include news alerts, announcements, educational information, and so forth.

While TV advertising is an engaging venue to advertise products or services, conventional TV advertising lacks targeted and personalized advertising. Additionally, conventional TV advertising does not enable retargeting or further engagement of viewers once the viewers have watched a commercial. For example, to reach a viewer with a TV AD, conventional TV advertising assumes a viewer is watching the same channel for a period of time. In this example, a content provider or advertiser will show the TV AD within the period of time. In another example, to reach a viewer with the TV AD, a content provider or advertiser will use conventional TV advertising and show the TV AD repeatedly over a period of time. In this example, the content provider or the advertiser assumes the viewer will see the TV AD within the period of time. However, these assumptions are often incorrect and can cause a viewer to miss viewing the TV AD at all. Alternatively, these assumptions can cause viewer to see the same TV AD multiple times, but the multiple viewings can have a negligible effect on the customer's intent to purchase a product shown in the TV AD. It would therefore be advantageous to determine what program a viewer is watching or is about to watch and send an identifier correlating to the program information to an overlay content server or an electronic device. The electronic device or overlay content server can use the identifier to target ADs to a viewer.

To make this determination, an ACR system can generate query fingerprints from media content (e.g., a media program or channel) a user is watching using automatic content recognition (ACR). The ACR system may compare query fingerprints with stored fingerprints within a database to determine a match. This database can be stored at a server. In one example, the server can be an ACR server.

The ACR system can send the query fingerprints to the server. The server can find one or more matches between the query fingerprints and the stored fingerprints. In one example, when the server finds a match, the server can identify a channel that a TV program is currently being streamed on. In another example, when the server finds a match, the server can identify the channel that the TV program is going to be streamed on.

The ACR server may then send a message to a requesting entity that is requesting an identification of the media content. The requesting entity may be an ACR system integrated into a smart TV or the overlay content server. The smart television can include a processing device and radio frequency (RF) circuitry. The processing device can execute an operating system (OS) and/or one or more applications, such as applications to access video-on-demand (VOD) content. The processing device can use an antenna of the radio frequency (RF) circuitry to communicate on a wireless local area network (WLAN). In one example, the processing device can use the RF circuitry to connect to the interne to access online interactive media or on-demand streaming media.

The requesting entity may use the identified media content to select overlay content that can be displayed to a user. The requesting entity may replace or overlay the different overlay content on top of the media content an electronic device is currently displaying to the viewer. In one example, the requesting entity can replace or overlay the media content the electronic device is currently displaying to the viewer during a commercial break with overlay content. In another example, the requesting entity may replace or overlay the media content the electronic device is displaying to the viewer during a regularly scheduled program with overlay content.

Because knowledge of the channel is time sensitive as commercial time slots change with different channels, an requesting entity can (such as a TV or set-top box) queries the server continuously or periodically. In one example, the ACR system that is integrated into the electronic device can query the server every second. In another example, the ACR system can query the server every several seconds. Conventionally, an ACR system fingerprints media content from the content feed and a reference database stores the fingerprints.

The ACR system of the electronic device may perform local ACR fingerprint matching using the reference database. For example, the media content fingerprinting occurs at a broadcast facility and then the ACR system of the electronic device performs local ACR fingerprint matching. However, the broadcast facility performing the fingerprinting and the electronic device performing the ACR fingerprint matching can result in detecting ADs and other media content only at the time of viewing without any advanced detection.

Described herein are methods, systems, and devices for matching fingerprints stored in a reference database with fingerprints generated from media content a user is watching while indexing the existing fingerprints in a reference database. By matching the fingerprints while indexing the existing fingerprints, an ACR system of the electronic device can detect content segments within other media content. In one example, the electronic device can index a live broadcast feed several seconds before the electronic device displays the live broadcast feed. One advantage of matching during indexing is to alert an electronic device of upcoming content. Another advantage of matching during indexing is to provide the electronic device analytics about how many channels and which channels have aired specific commercials or video clips.

In one example, an electronic device may include a computer-readable storage medium storing instructions. The computer-readable storage medium can be non-transitory. The electronic device can include processing logic to execute the instructions to generate a first fingerprint for media content a user is consuming. In another example, a method may include storing instructions on the computer-readable storage medium and executing the instructions by the processing logic to generate a query fingerprint for media content a user is consuming. The processing logic may include hardware (e.g., circuitry, dedicated logic, programmable logic, microcode, etc.), software (e.g., instructions executed by a processing device), firmware or a combination thereof. The electronic device can send the query fingerprint to a server. The server can send an identifier for a first channel a viewer is watching to the electronic device in response to the server finding a match between the query fingerprint and a media content fingerprint in a database. The electronic device may continuously receive multiple fingerprints from the server that are generated from the media content in locations in a broadcast chain that proceed where the user will view the media content. The electronic device can store the multiple fingerprints in a local database of the computer-readable storage medium.

The electronic device or server may send an identification of the channel to a look-up server that identifies the media content the user is watching. The look-up server may then send an identifier to an overlay content server indicating what media content the electronic device is displaying. The overlay content server can send media content to a look-up server, where the media content is contextually relevant to a subject matter of the media content. The overlay content server may deliver the media content to the electronic device for display as overlay content. In one embodiment, the overlay content can be media content that an ACR system overlays or superimposes on top of media content an electronic device is displaying to a viewer. In another embodiment, the overlay content can be media content that replaces media content an electronic device is displaying to a viewer, e.g., replacement media content. In one example, the overlay content server can store the overlay content. In another example, the overlay content server can be coupled to a memory device (such as another server) that can store the overlay content. In this example, the overlay content server can retrieve the overlay content from the memory device and send it to the electronic device. Alternatively, the ACR system can overlay the overlay content on top of a portion of the media content the electronic device is currently displaying to the viewer. For example, overlay content may be overlayed on top of a media content that refers to the subject matter of the media content.

To provide viewers with media content, an individual or an organization may decide to stream the media content to viewers, such as by delivering the media content over the Internet to the viewers. The media content used by the individual or the organization may be media content acquired from one or more live broadcast media feeds. For example, a media content provider may provide a user with a linear media channel. The linear media channel can be a live media feed source provided to a viewer over the Internet.

Described herein are methods, systems, and devices for limiting a number of times a multimedia item is displayed. When a first multimedia item has been displayed a threshold number of times, a second multimedia item can replace the first multimedia item. For example, processing logic of an electronic device can overlay the second multimedia item on to the first multimedia item to replace the first multimedia item. The processing logic may include hardware (e.g., circuitry, dedicated logic, programmable logic, microcode, etc.), software (e.g., instructions executed by a processing device), firmware or a combination thereof. In another example, the first multimedia item and the second multimedia item are multimedia items in a multimedia content set that includes multiple multimedia content items. Each time an individual has seen a first multimedia item on an electronic device, a record can be made of the viewing of the multimedia item on the electronic device. When a number of times the first multimedia item is to be displayed on the electronic device is exceeded, the processing logic of the electronic device can replace the first multimedia item with a second multimedia item in the multimedia content set.

One advantage of replacing the first multimedia item with the second multimedia item can be to eliminate over-exposing or under-exposing a viewer to the first multimedia item. For example, replacing the first multimedia item with the second multimedia item avoids showing the same person the same multimedia item an excessive number of times. Displaying the same multimedia item an excessive number of times has a diminishing return on investment (ROI) for displaying the AD. Another advantage of replacing the first multimedia item with the second multimedia item can be to sequentially display multimedia items in the multimedia content set to the viewer. For example, the electronic device can sequentially display the multimedia items of the multimedia content set to provide a progressive storyline to a viewer over multiple viewings by the user on the electronic device. Another advantage of replacing the first multimedia item with the second multimedia item can be to reduce a number of times or a period of time a content provider or advertiser shows the first multimedia item to achieve a desired confidence level that the AD has been viewed by the viewer. For example, once the first multimedia item has been displayed to the viewer the second multimedia item in the multimedia content set can be displayed to the view to reduce advertising costs to an advertiser. The advertising cost can be reduced by decreasing a number of advertising spaces the advertiser needs to buy and reducing a risk that the viewer will not see the first multimedia item of the multimedia content set. The multimedia items of the multimedia content set can be overlay content that includes: ADs, news alerts, announcements, or other information in addition to media content of a content feed that is displayed to the viewers.

Media content of a content feed can be matched with the overlay content using an overlay scheme. In one example, the overlay scheme can decompose the media content into a series of frames or sections using an automatic content recognition (ACR) device or technology. In another example, the frames or sections of the media content can include tags or identifiers used to match the frames or sections with the overlay content. For example, the tags or identifiers can include information describing content of the frames or sections for matching with the overlay content.

To enhance broadcast or streamed content, the electronic device displaying the media content form the content feed can identify the media content using the ACR system or technology. When the ACR system has identified the media content, the ACR system can provide overlay content to superimpose onto the media content. The media content can be textual, graphical, image or video content from a content distribution network.

FIG. 1 illustrates a system diagram of a content distribution network 100 according to one embodiment. In the content distribution network 100, a content provider 102 may broadcast a content feed to a local provider 106. The local provider 106 may include a headend 104 and an ACR fingerprinter server 105. The headend 104 of the local provider 106 can receive a content feed from the content provider 102. The headend 104 may generate a local content feed based on the received content feed. For example, the headend 104 may be a local affiliate broadcaster receiving a network channel with programming and advertisements from a national or global broadcaster. In one example, the headend 104 can be a source of a broadcast feed prior to the broadcast facility transmitting the broadcast feed. In another example, the headend 104 can be a distribution amplifier. The distribution amplifier can receive a source feed and it can create multiple outputs for different devices from the same source feed. The output feeds can be routed to various distribution outlets, such as for broadcast over the air (OTA), delivery to cable providers, delivery to satellite providers, and/or delivery to online streaming providers.

The headend 104 may communicate the local content feed to the ACR fingerprinter server 105, an over-the-air (OTA) broadcaster 108, and/or a multichannel video programming distributor (MVPD) 110. In one example, the ACR fingerprinter server 105 can be a device that is installed in a broadcast facility. The ACR fingerprinter server 105 can receive a feed from the headend 104. The ACR fingerprinter server 105 can fingerprint the feed and send the fingerprints to a cloud-based web service. In one embodiment, the ACR fingerprinter server 105 may be installed inside the broadcast facility in order to fingerprint a feed in advance of that feed being delivered to a display device, such as a television (TV).

The OTA broadcaster 108 and/or the MVPD 110 may communicate the local content feed to electronic devices 115. Some examples of the electronic devices 115 include electronic devices 118 and 120, a set top box 114 that streams media content to the electronic devices 118 and 120, as well as other devices 116 through which the user may stream the local content feed, e.g., wirelessly.

In one example, the OTA broadcaster 108 may broadcast the local content feed using traditional local television channels or radio channels. In this example, the electronic devices 118 and 120 may include antennas (such as TV antennas or radio antennas) to receive the local content feed. In another example, the MVPD 110 (such as a cable broadcaster or a satellite broadcaster) may communicate the local content feed to a set top box 114. In this example, the set top box 114 may format the content feed for the electronic devices 118 and 120 and may communicate the formatted content feed to the electronic devices 118 and 120. The electronic devices 118 and 120 may include a display device, such as a television screen or a touch screen, to display the local content to a viewer. Various components of the content distribution network 100 may be integrated or coupled to the electronic devices 118 and 120. For example, the electronic devices 118 and 120 can be smart televisions that include the antennas, the set top box 114, and the display device in a single unit.

The ACR fingerprint server 105 may analyze the local content feed and determine fingerprint information (e.g., fingerprints). The ACR fingerprint server 105 may communicate the fingerprints to the ACR system 124 or 126. The ACR systems 124 and 126 may be different ACR systems selected by device manufacturers, such as smart TV manufacturers. In one example, the ACR system 124 or 126 can include processing logic or a processing device to execute instructions or perform processes. In another example, the ACR systems 124 and 126 can be ACR web services for different ACR vendors. The ACR fingerprinter server 105 can enable the use of indexing clients from multiple ACR vendors. For example, different consumer electronics manufacturers (CEMs), such as TV manufactures, can independently select ACR vendors for integration into their electronic devices. To enable ACR-based functionality on a specific CEM's device, an ACR system can index broadcast feeds using ACR vendors CEMs have selected and integrated on that CEM's televisions. One advantage of integrating multiple ACR vendors onto the ACR fingerprinter server 105 can be to enable entities such as advertisers, advertising agencies, and content providers to interface with a single platform and deliver advanced advertising and content experiences to electronic devices from multiple CEMs.

In one example, the ACR system 124 can be coupled to a reference database 125. In another example, the ACR system 126 can be coupled to a reference database 127. The reference databases 125 and 127 can store fingerprints and media content. The content manager 122 can be a server component that receives messages from the ACR system 124 and/or 126. The messages can include information indicating media content that the electronic device 118 or 120 is going to display or is currently displaying. In one example, in response to the content manager 122 receiving the message, the content manager 122 can record an impression or association between the electronic device 118 or 120 and the media content stored in the database 123. In another example, in response to the content manager 122 receiving the message, the content manager 122 can generate and submit a query or search of the database 123 for available overlay content for the media content. The content manager 122 filters the overlay content using the device information for the electronic device 118 or 120. The content manager 122 can send an overlay content, via the ACR system 124 or 126, to the electronic device 118 or 120. In one embodiment, the electronic device 118 or 120 can display the overlay content to a viewer. In another embodiment, the electronic device 118 or 120 can replace the media content with the overlay content and display the overlay content to a viewer. In another example, the ACR system 124 or 126 can cause triggers to be displayed on the electronic device 118 or 120.

The electronic device 118 or 120 can recognize the triggers and send a request to the content manager 122 to record an impression or association between the electronic device 118 or 120 and the media content in the database 123. For example, the electronic device 118 or 120 can send a request to the content manager 122 to record whether a viewer changes a channel when the electronic device 118 or 120 displays select media content.

The automatic content recognition may be performed in a distributed architecture as described herein. In one embodiment, the ACR client 225 can reside on any of the electronic device 115, 118, or 120. In one embodiment, the ACR client 225 can perform automatic content recognition. In another embodiment, a local ACR system or a local ACR fingerprint matcher integrated into can perform the automatic content recognition. In another embodiment, the ACR client 225 may perform ACR fingerprint matching as described herein. In another embodiment, the ACR client 225 can be a client-side matching component.

The electronic devices 115, 118, or 120 can be a media device, such as a television, mobile phone, or dongle. The ACR client 225 can be software or firmware that executes or runs on the electronic devices 115, 118, or 120. The ACR client 225 can fingerprint media content (such as audio content, video content, closed captions, emergency messages, and so forth) during a playback of the media content. The ACR client 225 can communicate with ACR system 124 or 126 to facilitate identification of content and trigger events to cause the content overlay system to perform dynamic ad replacement and/or superimposing overlay content on top of the media content. The proceeding paragraphs describe the interactions of the ACR client 225 with the ACR fingerprint server 105 in greater detail.

The ACR fingerprint server 105 may analyze the local content feed that may include an ordered sequence of frames from the local content feed and capture fingerprints. The ACR fingerprint server 105 may communicate the fingerprints to the ACR system 124 or 126. The ACR systems 124 and 126 may be different ACR systems selected by device manufacturers, such as smart TV manufacturers. In one example, the ACR fingerprint server 105 may format fingerprints for the different ACR systems 124 and 126. The ACR systems 124 and 126 may establish communication connections with the different electronic devices 115. The electronic devices 115 may communicate fingerprint information to the ACR systems 124 and 126, respectively. When the ACR system 124 or 126 receives ACR fingerprint information from the electronic devices 115, the ACR system 124 or 126 may match the received fingerprints with those generated by the ACR fingerprint server 105. When a match occurs and the ACR system 124 or 126 identifies content, the ACR system 124 or 126 may communicate ACR events to a content manager 122.

In another example, the ACR system 124 or 126 may receive ACR fingerprint information from one of the electronic devices 115 and may match the received fingerprints with those generated by the ACR fingerprint server 105. When a match occurs and the ACR system 124 or 126 identifies content, the ACR system 124 or 126 may notify the electronic device 115 of the ACR events. The electronic device 115 may communicate ACR event information to the content manager 122. Alternatively, or additionally, the ACR system 124 or 126 may directly communicate the ACR events to the content manager 122. The ACR event fingerprint information may include: information indicating the advertisements in the local content feed; information indicating selected or flagged content in the local content feed;

or information indicating a change of a content channel at the electronic device 115 to new media content.

The ACR event information from the different ACR systems 124 and 126 may be in different formats and the content manager 122 may normalize the data into a common format. The content manager 122 can store the normalized data into a database 123. For example, the content manager 122 may receive disparate data sets from the ACR systems 124 and 126, the disparate data sets including similar but not identical data, such as data with the same content but formatted differently. The content manager 122 can process and reformat the disparate data sets to create a single data model or format (e.g., reformatted data sets). The content manager 122 can store the reformatted data sets in the database 123.

In one embodiment, to normalize disparate data sets from ACR systems 124 and 126, the content manager 122 may remove or filter data in the data sets. For example, some data sets may include fields or data that may be irrelevant to the content manager 122. In this example, the content manager 122 may remove or filter the irrelevant data. In another embodiment, to normalize the disparate data sets from ACR systems 124 and 126, the content manager 122 may map fields of the data sets. For example, when the content manager 122 receives a first data set from the ACR system 124 and a second data set from the ACR system 126, at least some of the data fields of the first data set and the second data set may be common to both the first data set and second data set. However, the common data fields may be located at different places in the first data set and second data set. In this example, the content manager 122 may map the different data fields of the first data set and second data set to normalized fields and have the same data fields in the same data field locations in the database 123.

In another embodiment, to normalize disparate data sets from the ACR systems 124 and 126, the content manager 122 may derive data from the data sets. For example, data from the ACR systems 124 and 126 may not include all of the fields that are needed to fill the data fields in the database. However, the content manager 122 may use other fields in the data sets from the ACR systems 124 and 126 to derive data for these data fields.

In one example, the database 123 may include data fields for such as a state in a country field, a designated market area (DMA), and a county and/or city field but the data sets from the ACR systems 124 and 126 may only include zone improvement plan (ZIP) codes. In this example, the content manager 122 may use the ZIP codes to derive data for the fields in the database. In another example, the data set may not include any geographic location information, but may include an internet protocol (IP) address of the ACR systems 124 and 126. In this example, the content manager 122 may use a geo-IP lookup service to derive the state, DMA, county, city and ZIP code information.

In another example, the database 123 may include demographic fields such as an age field, a gender field, a household income field, and so forth. However, the data sets from the ACR systems 124 and 126 may not include the demographic fields or demographic data. In this example, the ACR systems 124 and 126 may provide the content manager 122 with the IP address of the electronic devices 115. The content manager 122 may use the IP addresses to determine the demographic data to populate the data fields in the database.

In another example, a field in a first data set from the ACR system 124 may include local time zone information, such as a mountain daylight time (MDT) zone, and a second data set from the ACR system 126 may include information from another time zone, such as a coordinated universal time (UTC) zone. The database may store all data using the UTC and the content manager 122 may convert the local time to UTC before storing the data in the database 123.

In one embodiment, the content manager 122 may use the normalized data to generate reports or data (viewing data) about user's viewing behavior across different ACR technology vendors and smart TV or other Internet-connected video devices. The content manager 122 and the electronic devices 115 may include communications interfaces to communicate information, such as overlay content, between the electronic devices 115 and the content manager 122. In one example, the communication interface may communicate the information using a cellular network and/or a wireless network. In one example, the communication network may be a cellular network employing a third generation partnership project (3GPP) release 8, 9, 10, 11, or 12 or Institute of Electronics and Electrical Engineers, Inc. (IEEE®) 802.16p, 802.16n, 802.16m-2011, 802.16h-2010, 802.16j-2009, 802.16-2009. In another embodiment, the communication network may be a wireless network (such as a network using the Wi-Fi® technology developed by the Wi-Fi Alliance) that may follow an IEEE® standard developed by the Institute of Electrical and Electronics Engineers, Inc., such as the IEEE 802.11-2012, IEEE 802.11ac, or IEEE 802.11ad standards. In another embodiment, the communication network may deploy Bluetooth® connections developed by the Bluetooth Special Interest Group (SIG) such as Bluetooth v1.0, Bluetooth v2.0, Bluetooth v3.0, or Bluetooth v4.0. In another embodiment, the communication network may be a Zigbee® connection developed by the ZigBee Alliance such as IEEE 802.15.4-2003 (Zigbee 2003), IEEE 802.15.4-2006 (Zigbee 2006), IEEE 802.15.4-2007 (Zigbee Pro).

In one example, the content manager 122 may instruct the electronic devices 115 to replace portions of the local content feed received from the OTA broadcaster 108 or the MVPD 110 with overlay content. In another example, the content manager 122 may instruct the electronic devices 115 to overlay or superimpose overlay content onto portions of the local content feed. The content manager 122 may aggregate ACR event information across multiple ACR systems 124 and 126 and may communicate overlay content to different electronic devices 115 (such as electronic devices from different device manufacturers).

The content manager 122 may also establish communication connections with other devices 116. In one example, the other devices 116 may communicate with the electronic devices 118 and 120 and provide an additional screen (e.g., a second screen) to display overlay content. For example, the electronic devices 118 and 120 may receive the local content feed from the OTA broadcaster 108 or the MVPD 110 and display the local content feed to a viewer. The other devices 116 may also communicate ACR event information to the ACR systems 124 and 126 when an ACR event occurs, as discussed in the preceding paragraphs. When the content manager 122 receives the ACR event information, the content manager 122 may communicate overlay content to the other devices 116.

In one example, the electronic devices 118 and 120 may continue to display the local content feed while the other devices 116 display the overlay content. In another example, the electronic devices 118 and 120 and the other devices 116 may both display the overlay content. In another example, the electronic devices 118 and 120 and the other devices 116 may display a portion of the overlay content and a portion of the local content feed. In another example, the electronic devices 118 and 120 and the other devices 116 may display different local content feeds and different overlay content.

In one example, the electronic devices 118 and 120 and/or the other devices 116 may display the overlay content at the time the electronic devices 118 and 120 and/or the other devices 116 receive the overlay content. In another example, the electronic devices 118 and 120 and/or the other devices 116 may delay displaying the overlay content for a threshold period of time. In one embodiment, the threshold period of time may be a predefined period of time. In another embodiment, the content manager 122 may select a period of time for the electronic devices 118 and 120 and the other devices 116 to delay displaying the overlay content.

Figure 2A:
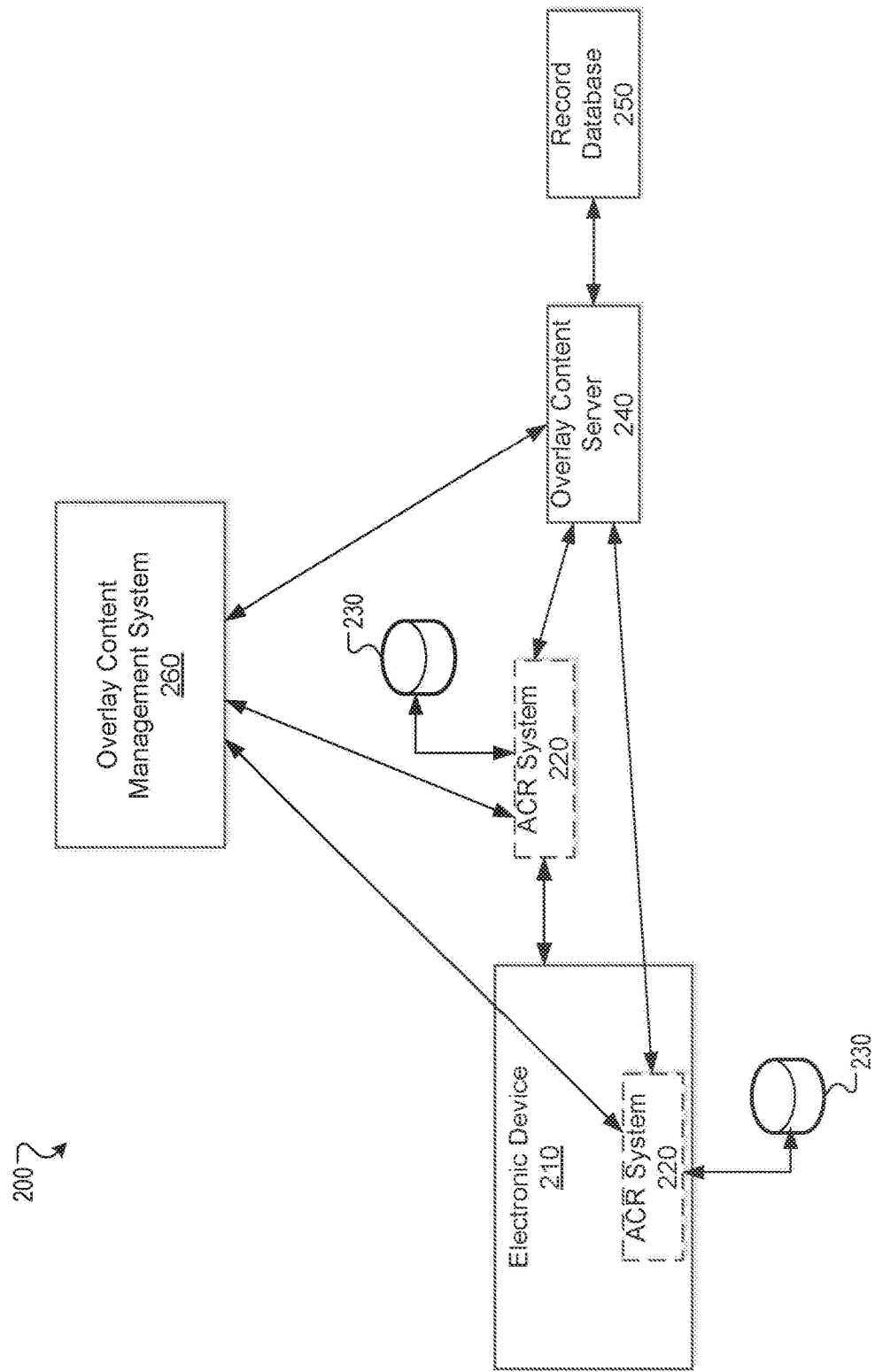
FIG. 2A illustrates a system diagram of a content overlay network according to one embodiment.

FIG. 2A illustrates a system diagram of a content overlay network 200 according to one embodiment. The content overlay network 200 can include an electronic device 210, an ACR system 220, a content database 230, an overlay content server 240, a record database 250, and an overlay content management system 260. The ACR system 220 provides broadcast digital content to the electronic device 210. The broadcast digital content can include overlay content the ACR system 220 superimposes or overlays on top of media segments for the electronic device 210 to display to a viewer. A media segment can be a segment or portion of the media content. For example, the media segment can be a segment or portion of media content for a TV show or a movie, such as a TV show or movie clip. In another example, the media segment of the media content can be a commercial that is part of media content for the TV show or the movie.

In one embodiment, the ACR system 220 is integrated into the electronic device 210. In another embodiment, the ACR system 220 is coupled to the electronic device 210. In one example, the ACR system 220 can be directly coupled to the electronic device 210 using an input port of the electronic device 210. For example, the ACR system 220 is a High-Definition Media Interface (HDMI) dongle that plugs into an HDMI input terminal of the electronic device 210. In this example, the ACR system 220 can include an HDMI input port, an HDMI output port, and a network interface to receive broadcast content or media segments from a content provider. In another example, the ACR system 220 can be indirectly couple to the electronic device 210 via another device that is coupled to the electronic device 210, such as an audio and/or video (A/V) device.

The electronic device 210 can use the ACR system 220 to display targeted or personalized overlay content segment to viewers. The overlay content segment can be an audio, video, and/or graphical segment or clip of content. In one example, the overlay content segment can be a media object or file that includes an audio/video segment of content that is a replacement AD. In another example, overlay content segment is an audio/video segment of a larger audio/video object or file that includes other overlay content segments.

In one embodiment, the ACR system 220 can use digital watermarking to ACR broadcast content. For digital watermarking, a content provider or a broadcaster can process the broadcast content to insert watermark data within a content signal prior to broadcast the content signal. The electronic device 210 or the ACR system 220 can detect the watermark data to identify and synchronize media segments with the broadcast content.

In another embodiment, the ACR system 220 can identify media content of the broadcast content, using content fingerprinting, as the electronic device displays the media content. The content fingerprinting can include the ACR system 220 matching a sequence of content fingerprints for media content the electronic device 210 is displaying with of content fingerprints in a fingerprint database. An advantage of content fingerprinting can be to process the media segment while the media segment is being broadcasted (e.g. live processing) or within a threshold period of time, such as several seconds, after the media segment is broadcast (e.g. substantially live processing). The content overlay network 200 can adjust overlay content segments, as the electronic device 210 displays the content, based on viewer behavior during a content broadcast (e.g. live or substantially live adjustments). In one example, the viewer behavior can include the electronic device 210 receiving a command from a user device to change a channel or to pause a display of content. In another example, the viewer behavior can include the electronic device 210 receiving a command from the user device to display time-shifted content. As the viewers select or change the content, the content overlay network 200 can switch what overlay content is superimposed onto the media content.

The overlay content server 240 is coupled to the ACR system 220. The overlay content server 240 can receive overlay content from a content provider or advertiser. The overlay content server 240 can store media segments, overlay content segments, and format information for the media segments and overlay content segments. The overlay content server 240 can send media segments to the electronic device 210 in a select overlay format of the overlay formats.

The record database 250 is coupled to the overlay content server 240. The record database 250 can maintain a record of the media segments or overlay content segments that the electronic device 210 displays. In one embodiment, the electronic device 210 has a unique identifier (UID) associated with it that uniquely identifies the electronic device 210. The UID can also be associated with media segments or overlay content segments to indicate what media segments or overlay content segments the electronic device 210 has displayed, as discussed in the proceeding paragraphs. In another embodiment, the record database 250 can receive a message from the overlay content server 240. In one example, the message can include a media segment ID that identifies a media segment and a UID that is associated with the media segment ID. In another example, the message can include an overlay content segment ID that identifies an overlay content segment and a UID that is associated with the overlay content segment ID. The record database 250 can store various media and overlay content segment IDs with their associated UIDs for subsequent lookups by the overlay content server 240. The overlay content server 240 can search the record database 250 to determine when a media segment or overlay content segment associated with a respective media segment ID or overlay content segment ID has previously been displayed on the electronic device 210 with the UID.

In one embodiment, the overlay content management system 260 can include an input device to receive configuration information for a sequence of media segments and overlay content segments. In one example, the input device can be a software interface (such a web portal) on an electronic device, where a user can input configure information to configure the sequence of media segments and overlay content segments at the overlay content server 240. For example, the overlay content management system 260 can be an end-user accessible website for creating, viewing, updating, and deleting overlay content and replacement videos.

In one example, the user can use the input device to set rules or criteria for the overlay content server 240 to use to select an overlay content segment of the overlay content set. In one embodiment, the rules or criteria can include a sequence of items in an overlay content set, such as media content and overlay content segments. In another embodiment, the rules or criteria can include displaying different overlay content segments in view of demographic information of the user. In one example, when the user is a male, the electronic device 210 may display selected overlay content segments. In another example, when the user is a female, other overlay content segments may be displayed. In another embodiment, the rules or criteria can include displaying different overlay content segments in view of a time of day. For example, in the morning the electronic device 210 can display overlay content segments related to breakfast, in the evening the electronic device 210 can display overlay content segments related to dinner, and in the night time the electronic device 210 can display overlay content segments related to adult themes. In another embodiment, the overlay content server 240 can include an input device to receive configuration information to order media content and overlay content segments in a linear sequence. For example, a user can use a graphical user interface (GUI) to send configuration information to the overlay content server 240 to order the sequence of media content and overlay content segments.

In another example, the overlay content management system 260 can enable a user to set up the filtering criteria which can be used by the content manager 122. The data that the user selects or sets up in the overlay content management system 260 is stored in the database 123. The overlay content management system 260 can enable a user to view reports related to the displaying of the overlay content and replacement videos.

Figure 2B:
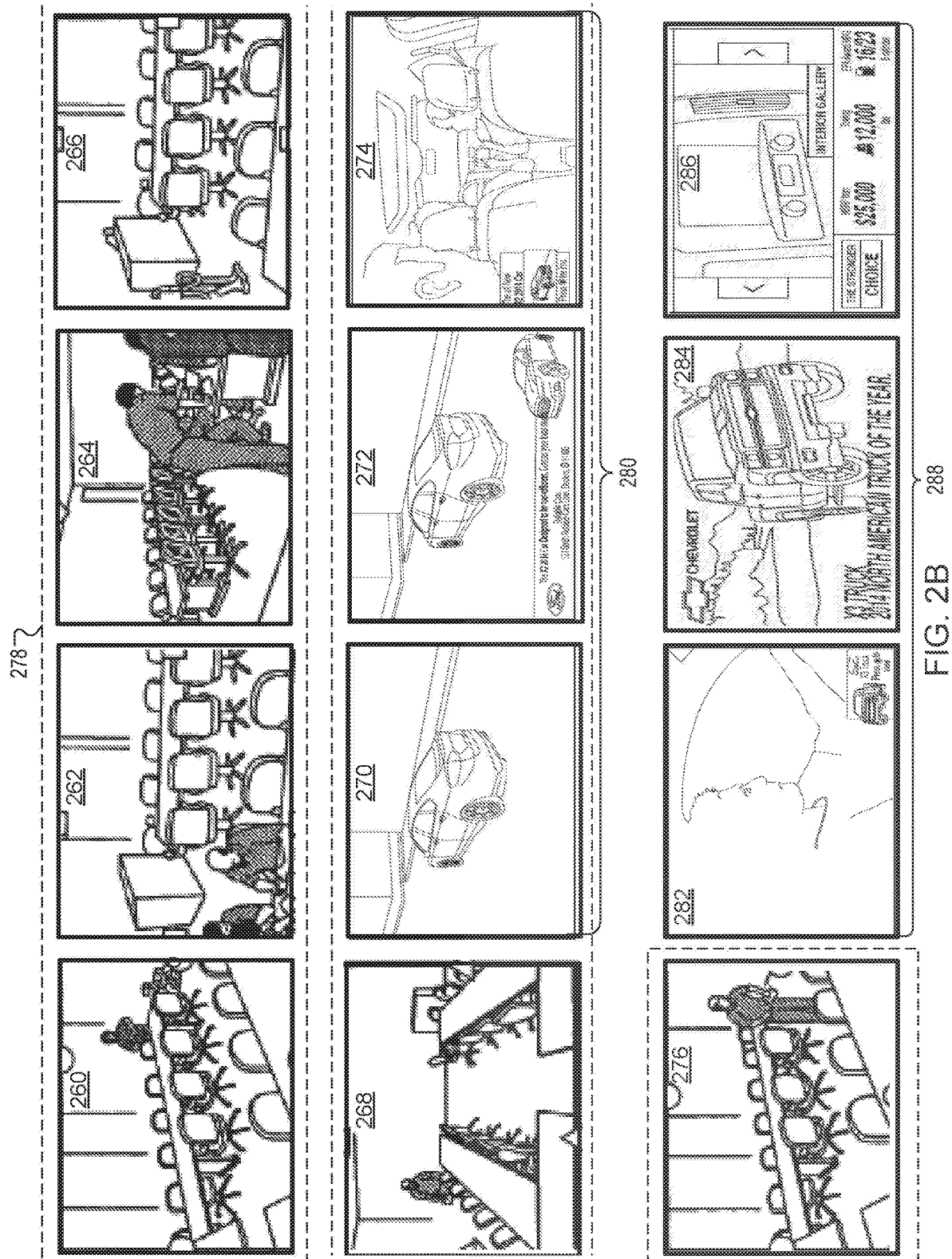
FIG. 2B illustrates a system diagram of a content overlay network according to one embodiment.

FIG. 2B illustrates media content 278 with a media segment 280 according to one embodiment. Some numbers in FIG. 2B are similar to some numbers in FIG. 2A as noted by similar reference numbers, unless expressly described otherwise. In one embodiment, the ACR system 220 can use fingerprinting to identify the media content 278, as discussed in the preceding paragraphs. The media content 278 can include frames 260-276. Frames 270-274 can be the media segment 280 that is a segment of portion of the media content 278. In one embodiment, the frames 260-268 and 276 can be frames in the media content 278 that are part of a TV show or movie and the frames 270-274 and the frames 270-274 in the media segment 280 can be a commercial or AD that is integrated into the TV show or movie. In one example, the media segment 280 is a commercial that is integrated into a TV show or movie which is broadcast or streamed to the electronic device 210. In another example, the media segment 280 can be a segment or portion of the TV show or a movie, such as a TV show clip or movie clip. In another embodiment, the overlay content server 240 can determine that the media segment 280 was previously displayed on the electronic device 210 and the ACR system 220 can replace the media segment 280 with the overlay content segment 288, as discussed in greater detail in the proceeding paragraphs. The overlay content segment 288 can include frames 282-286. In one example, the overlay content segment 288 can be a replacement AD that the ACR system 220 overlays or superimposes on top of the frames 270-274 in the media segment 280. In one another, the overlay content segment 288 can be a replacement AD that the ACR system 220 replaces the frames 270-274 of media segment 280 with the frames 282-286. The number of frames and the number of media segments in media content are not intended to be limiting. For example, the media content 278 can include multiple media segments 280 that can have varying numbers of frames.

Figure 3A:
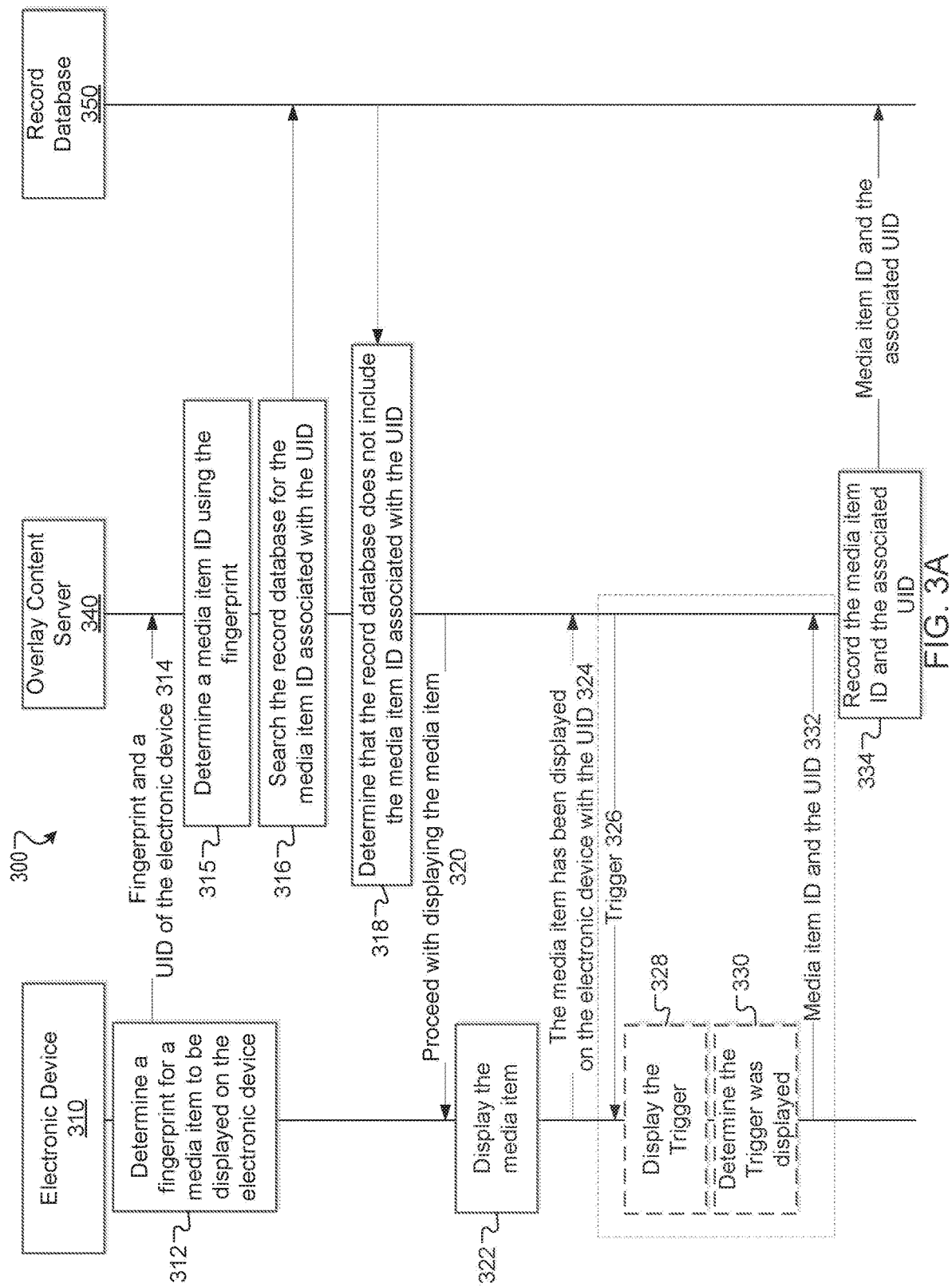
FIG. 3A illustrates a diagram of a method for determining when a media segment has previously been displayed on an electronic device according to one embodiment

FIG. 3A illustrates a diagram of a method 300 for determining when an electronic device 310 has previously displayed a media segment on according to one embodiment. The method 300 may at least partially be performed by processing logic that includes hardware (e.g., circuitry, dedicated logic, programmable logic, microcode, etc.), software (e.g., instructions executed by a processing device), firmware or a combination thereof. The method 300 may be performed by all or part of the content distribution network 100 of FIG. 1 or all or part of the content overlay network 200 of FIG. 2. For example, the method 300 may be performed by all or part of the processing logic of the automatic content recognition (ACR) system 124 or 126 (FIG. 1), the electronic device 115 (FIG. 1) or the processing logic of the ACR system 220 (FIG. 2).

Referring to FIG. 3A, the method 300 begins with the electronic device 310 determining a fingerprint for a media segment scheduled to be displayed on the electronic device 310 (312). In one example, the media segment can be media content the electronic device 310 receives from a broadcaster or content provider. In another example, the media segment can be an overlay content the electronic device 310 receives from the overlay content server 240. In another example, the electronic device 310 can have a first automatic content recognition (ACR) system and be connected to the overlay content server via a first network connection. The electronic device 310 can receive media content from a content source device (such as a broadcaster) over a second network connection between the content source device and the electronic device 310. In one embodiment, a network connection can be a wired communication channel to communicate data, such as a communication channel via an Ethernet cable or a coaxial cable. In another embodiment, the network connection can be a wireless communication channel to communicate data, such as a cellular communication channel or a WLAN communication channel.

The method can also include the electronic device 310 sending a message to the overlay content server 340 (314). The message can include the fingerprint and a UID associated with the electronic device. The method can include the overlay content server 340 determining a media segment ID associated with the media segment using the media segment fingerprint to identify the media segment (315). For example, the overlay content server 340 can search a database for a media segment. Each media segment in the database can have a media segment ID associated with it. The media segment ID can include information associated with the media segment, such as a subject matter description of the media segment (such as a genre or content description of the media segment), a play length of the media segment, a display resolution level of the media segment, and so forth. The method can include the overlay content server 340 searching the record database 350 for an entry of the media segment ID associated with the UID (316). In one embodiment, the overlay content server 340 can be connected to the record database 350 via a third network connection.

The method can include the overlay content server 340 determining that the record database 350 is not storing the media segment ID that is associated with the UID (318). The method can include the overlay content server 340 sending a notification to the electronic device 310, instructing the electronic device 310 to display the media segment (320). The method can include the electronic device 310 displaying the media segment in response to receiving the notification (322). In one embodiment, when the electronic device 310 does not receive a notification before the media segment is scheduled to be displayed, the electronic device 310 will display the media segment. The method can include the electronic device 310 sending a notification to the overlay content server 340 that the media segment has been displayed on the electronic device 310 with the associated UID (324). In one embodiment, the method can include the overlay content server 340 recording the media segment ID and the associated UID into the record database 350 in response to receiving the notification that the electronic device 310 has displayed the media segment (334).

In one embodiment, after the electronic device 310 has displayed the media segment, the overlay content server 340 can determine that the media segment has been displayed using a trigger overlay. The method can include the overlay content server 340 sending the trigger overlay to the electronic device 310 when the overlay content server 340 receives a notification (326). The method can include the electronic device 310 displaying the trigger overlay (328). In one embodiment, the trigger overlay can be an invisible overlay content segment that the electronic device 310 displays in response to an ACR system of the electronic device 310 determining that the electronic device 310 has displayed a particular media segment or is currently displaying the particular media segment. In another embodiment, the trigger is a web request to a specific endpoint on the overlay content server 340 (illustrated in FIG. 2). The method can include the ACR system of the electronic device 310 determining that the electronic device 310 displayed the trigger overlay (330). The method can include the electronic device 310 sending a notification with the media segment ID and the UID to the overlay content server 340 when the electronic device 310 has displayed the trigger (332). In one embodiment, when the ACR system of the electronic device is a set-top box coupled to the electronic device 310, the ACR system may not detect when the electronic device 310 has displayed the media segment and can accordingly send the notification in response to the ACR system detecting the trigger content. The method can include the overlay content server 340 recording the media segment ID and the associated UID into the record database 350 in response to the overlay content server 340 receiving the notification with the media segment ID and the UID (334).

Figure 3B:
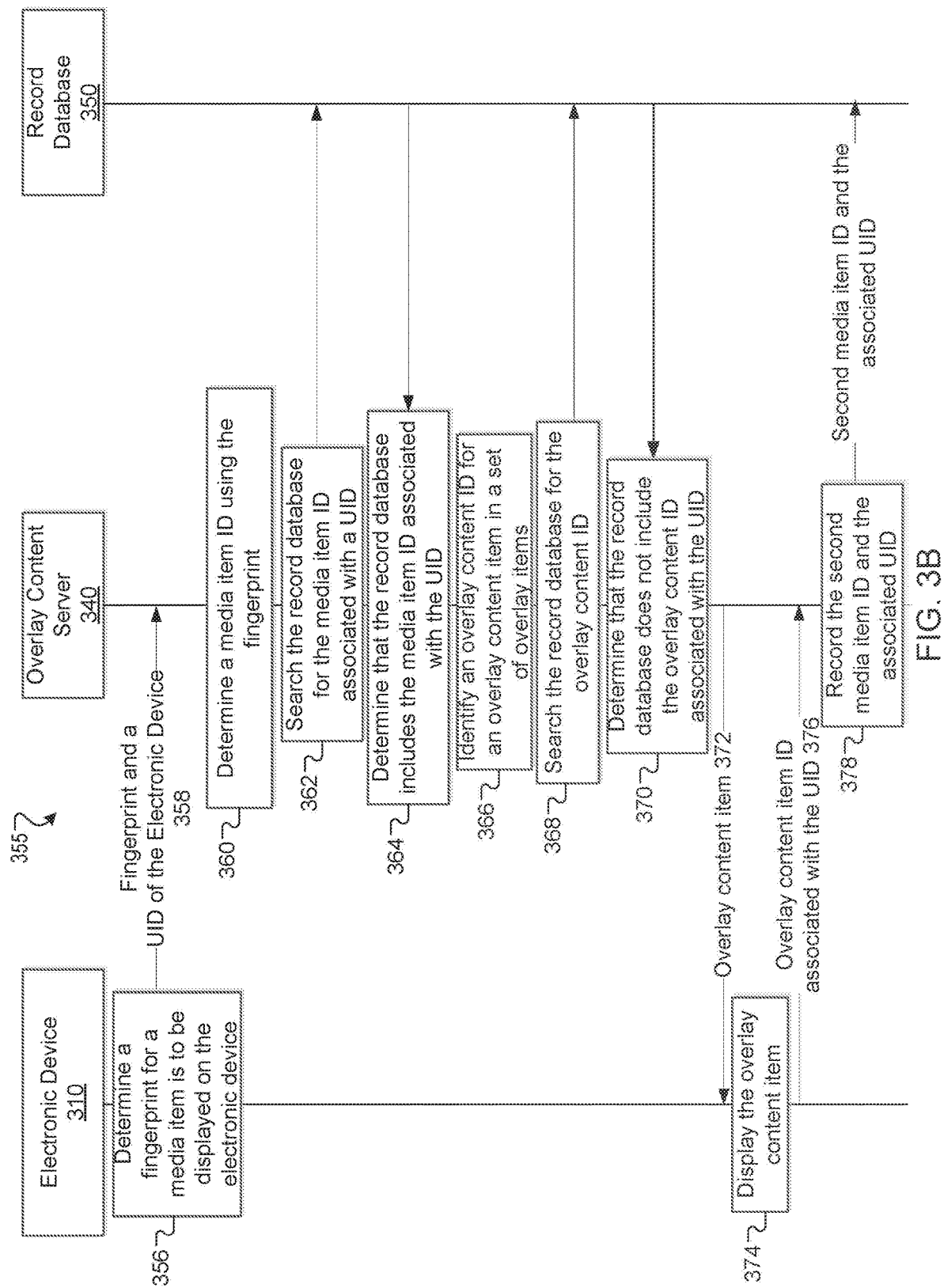
FIG. 3B illustrates a diagram of a method for determining when to replace a media segment that has previously been displayed on an electronic device according to one embodiment

FIG. 3B illustrates a diagram of a method 355 for determining when to replace a media segment the electronic device 310 has previously been displayed according to one embodiment. The method 355 may at least partially be performed by processing logic that includes hardware (e.g., circuitry, dedicated logic, programmable logic, microcode, etc.), software (e.g., instructions executed by a processing device), firmware or a combination thereof. The method 355 may be performed by all or part of the content distribution network 100 of FIG. 1 or all or part of the content overlay network 200 of FIG. 2. For example, the method 355 may be performed, at least in part, by the processing logic of the automatic content recognition (ACR) system 124 or 126 or the electronic device 115 (FIG. 1) or the processing logic of the ACR system 220 (FIG. 2). Some numbers in FIG. 3B are similar to some numbers in FIG. 3A as noted by similar reference numbers unless expressly described otherwise.

Referring to FIG. 3B, the method 355 begins with the electronic device 310 determining a fingerprint for a media segment the electronic device 310 is to be display (356). The method can also include the electronic device 310 sending a message to the overlay content server 340 (358). The message can include the fingerprint and a UID associated with the electronic device 310. The method can include the overlay content server 340 determining a media segment ID for the media segment using the fingerprint to identify the media segment (360). For example, the overlay content server 340 can search a database for the fingerprint and identify the media segment ID associated with the fingerprint. The media segment ID can include information associated with the media segment, such as a subject matter of the media segment, a play length of the media segment, a display resolution level of the media segment, and so forth. The method can include, the overlay content server 340 searching the record database 350 for the media segment ID associated with the UID (362). The method can include the overlay content server 340 determining that the record database 350 includes an entry for the media segment ID associated with the UID (364). When the record database 350 includes the entry of the media segment ID associated with the UID, the entry can indicate that the electronic device 310 previously displayed the first media segment associated with the media segment ID.

The method can include the overlay content server 340 identifying an overlay content segment ID for an overlay content segment in a set of overlay content segments (366). In one embodiment, the set of overlay content segments includes the overlay content segments to overlay or replace the media segment. In another embodiment, the set of overlay content segments includes the media segment. The method can include the overlay content server 340 searching the record database 350 for an entry of the overlay content segment ID (368). The method can include the overlay content server 340 determining that the record database 350 does not include the entry for the overlay content segment ID associated with the UID (370).

When the record database 350 does not include the entry for the overlay content segment ID associated with the UID, the absence of the entry can indicate that the electronic device has not previously displayed the overlay content segment that is associated with the overlay content segment ID. The overlay content server 340 can store the overlay content segment IDs associated with the overlay content segments in the overlay content set. In one example, the overlay content server 340 can iteratively search the record database 350 to identify an nth overlay content segment that has not previously been displayed. For example, when the record database 350 includes a first entry of a first overlay content segment ID associated with a first overlay content segment in the overlay content set, the overlay content server 340 can sequentially or randomly search the record database 350 for a second entry of a second overlay content segment ID for a second overlay content segment in the overlay content set, a third entry of a third overlay content segment ID for a third overlay content segment in the overlay content set, a fourth entry of a fourth overlay content segment ID for a fourth overlay content segment in the overlay content set, and so forth until the overlay content server 340 identifies an nth entry for an overlay content segment ID for an nth overlay content segment that is not stored at the overlay content server 340.

In one example, the overlay content server 340 can send the nth overlay content segment instead of the first overlay content segment. In another example, when the record database 350 includes each of the overlay content segment IDs for the media and overlay content segments in the overlay content set, the overlay content server 340 can send an overlay content segment from a different overlay content set to the electronic device 310. In this example, the content overlay network 200 can send a refund notification to a device associated with a user or administrator. For example, the user or administrator can be that an individual or a representative of a company, such as an advertiser that paid to have overlay content segments in the overlay content segment set displayed to viewers. The refund notification indicates that the overlay content segments in the overlay content segment set have been displayed on the electronic device 310 prior to a threshold number of overlay slots sold to the company. In this example, the individual or the representative that provided the initial overlay content set can receive a refund for a payment associated with the overlay content server 340 finishing sending the media segments and not using all of the overlay slots the individual or the representative paid for. In another example, when the record database 350 includes all of the media segment IDs for the media segments of the overlay content set, the overlay content server 340 can erase the media segment IDs associated with the overlay content set for the electronic device 310 and start over in a sequence of showing the media and overlay content segments of the overlay content set.

The method can include the overlay content server 340 sending the overlay content segment associated with the overlay content segment ID (372). The method can include the electronic device 310 displaying the overlay content segment (374). In one example, the electronic device 310 can display the overlay content segment on the electronic device 310 by overlaying or superimposing the overlay content segment over the media segment. The method can include the electronic device 310 sending a notification to overlay content server 340 that includes the overlay content segment ID and the UID when the electronic device 310 has displayed the overlay content segment (376).

The method can include the overlay content server 340 recording an entry for the overlay content segment ID and the associated UID into the record database 350 in response to the overlay content server 340 receiving the notification (378). Alternatively, the overlay content server 340 can record an entry for the overlay content segment ID and the associated UID into the record database 350 when the overlay content server 340 sends the overlay content segment to the electronic device 310. The preceding example illustrates the electronic device 310 displaying an overlay content segment. However, this exemplary method is not intended to be limiting. In one example, the method 355 can be an iterative method where multiple overlay content segments or all of the overlay content segments in an overlay content set can be sequentially overlayed over previously displayed media segments.

Additionally, an order of the media and overlay content segments in the overlay content set can be sequential, random, or any other order to display a media or overlay content segment that has previously not been displayed. In another example, the overlay content server 340 can correct a sequence of displaying the media segment and the overlay content segments when a sequence is out of order. For example, the overlay content server 340 can determine that the media segment the electronic device 310 is scheduled to display is third in a sequence of items in the overlay content set. The overlay content server can determine which overlay item in the overlay content set is the first in a sequence for an overlay content set. The overlay content server 340 can send the first overlay content segment to the electronic device 310 for the electronic device 310 to display. An advantage of correcting a sequence of the display of the media segments is that the first media segment in the sequence is displayed to the viewer prior to the viewer seeing the second media segment in the sequence. For example, the media segments can be sequenced to tell a story for a product beginning with the first media segment.

In one embodiment, the system 260 can be an input device to receive a threshold number indicating a number of instances a multimedia item can be displayed. In one example, the input device can be a software interface, such a web portal, on an electronic device, where a user can input the threshold number of instances at the server 240. In one example, the system can receive a multimedia item and threshold number associated with it, where the threshold number indicated a maximum number of times the multimedia item can be displayed on a display device. In one embodiment, the system 260 can include a memory device to store the multimedia item and the associated threshold number. In another embodiment, the system 260 can be coupled to a memory device to store the multimedia item and the associated threshold number. The memory device can be coupled to the system 260 and the server 240.

In one example, the user can set rules or criteria for the server 240 to use to set the threshold number of instances for a multimedia item. In another embodiment, the server 240 can include an input device to receive a threshold number indicating a number of instances a multimedia item can be displayed.

Figure 5:
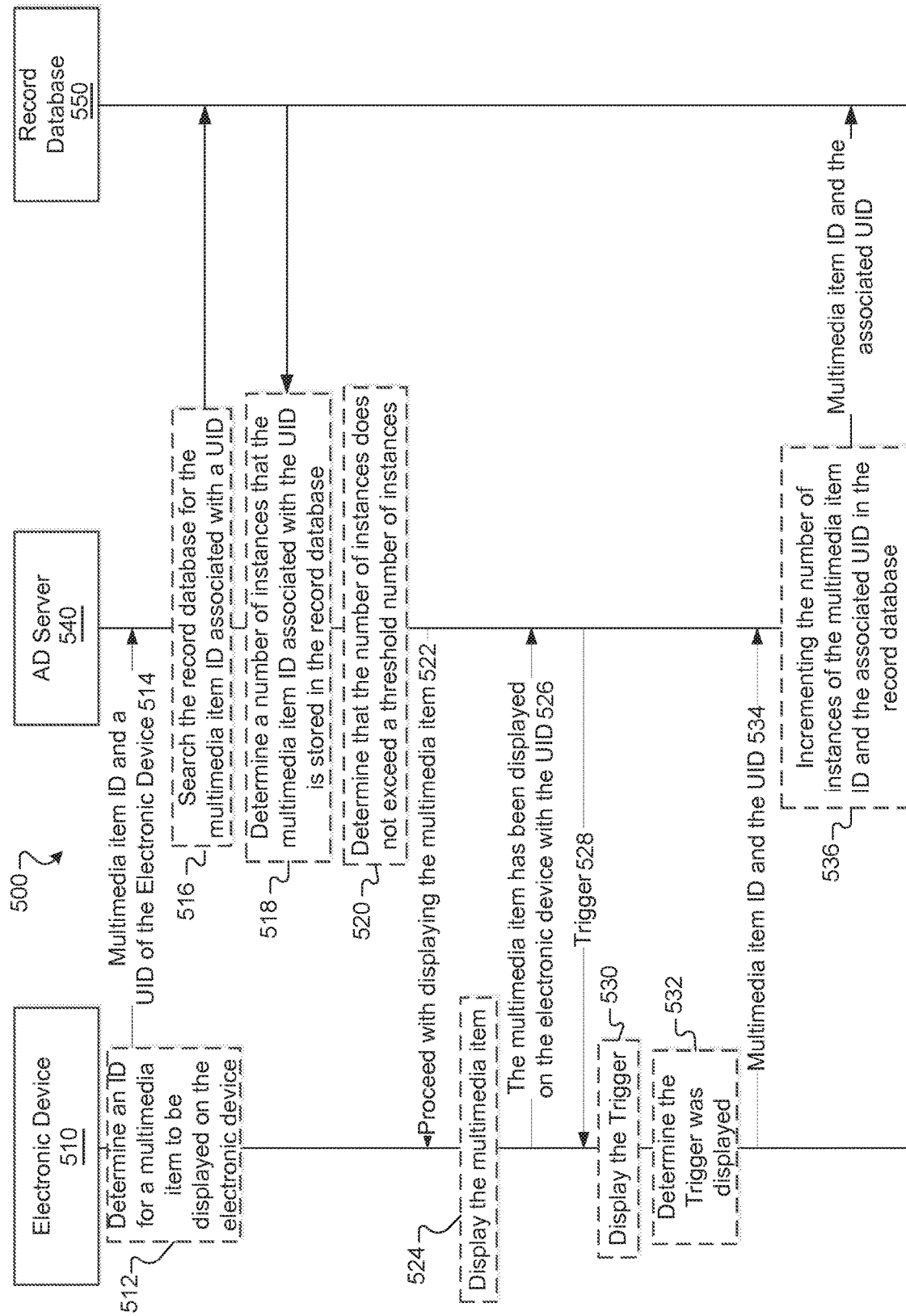
FIG. 5 illustrates a diagram of a method for determining when to replace a multimedia item that has previously been displayed on an electronic device according to one embodiment.

FIG. 5 illustrates a diagram of a method 500 for determining when to replace a multimedia item that has previously been displayed on an electronic device 510 according to one embodiment. The method 500 may at least partially be performed by processing logic that includes hardware (e.g., circuitry, dedicated logic, programmable logic, microcode, etc.), software (e.g., instructions executed by a processing device), firmware or a combination thereof. The method 500 may be performed by processing logic of the electronic device 210 (illustrated in FIG. 2), the processing logic of the system 220 (illustrated in FIG. 2), or the processing logic of the server 240 (illustrated in FIG. 2).

Referring to FIG. 5, the method 500 begins with determining, by processing logic of the electronic device 510, a multimedia item ID for a multimedia item to be displayed on the electronic device 510 (512). The method can also include sending, by the processing logic of the electronic device 510, a message to the AD server 540 (514). The message can include the multimedia item ID and a UID associated with the electronic device 510 to display the multimedia item. The method can include searching, by processing logic of the AD server 540, the record database 550 for the multimedia item ID associated with the UID (516). The method can include determining, by the processing logic of the AD server 540, a number of instances that the multimedia item ID associated with the UID is stored in the record database 550 (518). The method can include determining, by the processing logic of the AD server 540, that the number of instances does not exceed a threshold number of instances (520). In one example, the threshold number of instances can be set by a system administrator or an advertiser when the multimedia item is uploaded or stored in a database coupled to an ad management system (AMS). In another example, different threshold number of instances can be set for different multimedia items.

The method can include sending, from the AD server 540, a notification instructing the electronic device 510 to display the multimedia item (522). The method can include displaying the multimedia item on a display of the electronic device 510 when the notification is received (524). In another embodiment, when the electronic device 510 does not receive a notification before the multimedia item is scheduled to be displayed, the electronic device 510 will display the multimedia item. The method can include sending, to the AD server 540, a notification that the multimedia item has been displayed on the electronic device 510 (526). The method can include sending, to the electronic device 510, a trigger when the notification has been received (528). The method can include displaying the trigger on the electronic device 510 (530). In one embodiment, the trigger can be an invisible overlay that is displayed on the electronic device 510 when the ACR system 220 (illustrated in FIG. 2) determines that a particular multimedia item was displayed in the electronic device 510 or is currently being displayed on the electronic device 510. In another embodiment, the trigger a web request to a specific endpoint on the server 240 (illustrated in FIG. 2). The method can include determining, using an ACR system of the electronic device 510, that the trigger was displayed (532). The method can include sending, to the AD server 540, a notification with the multimedia item ID and the UID when the trigger has been display (534). The method can include incrementing, by the AD server 540, the number of instances of the multimedia item ID and the associated UID in the record database 550 (536). For example, each time the multimedia item is displayed on the electronic device 510, the AD server 540 can increment the number of instances recorded for the multimedia item ID and the associated UID in the record database 550.

Figure 6:
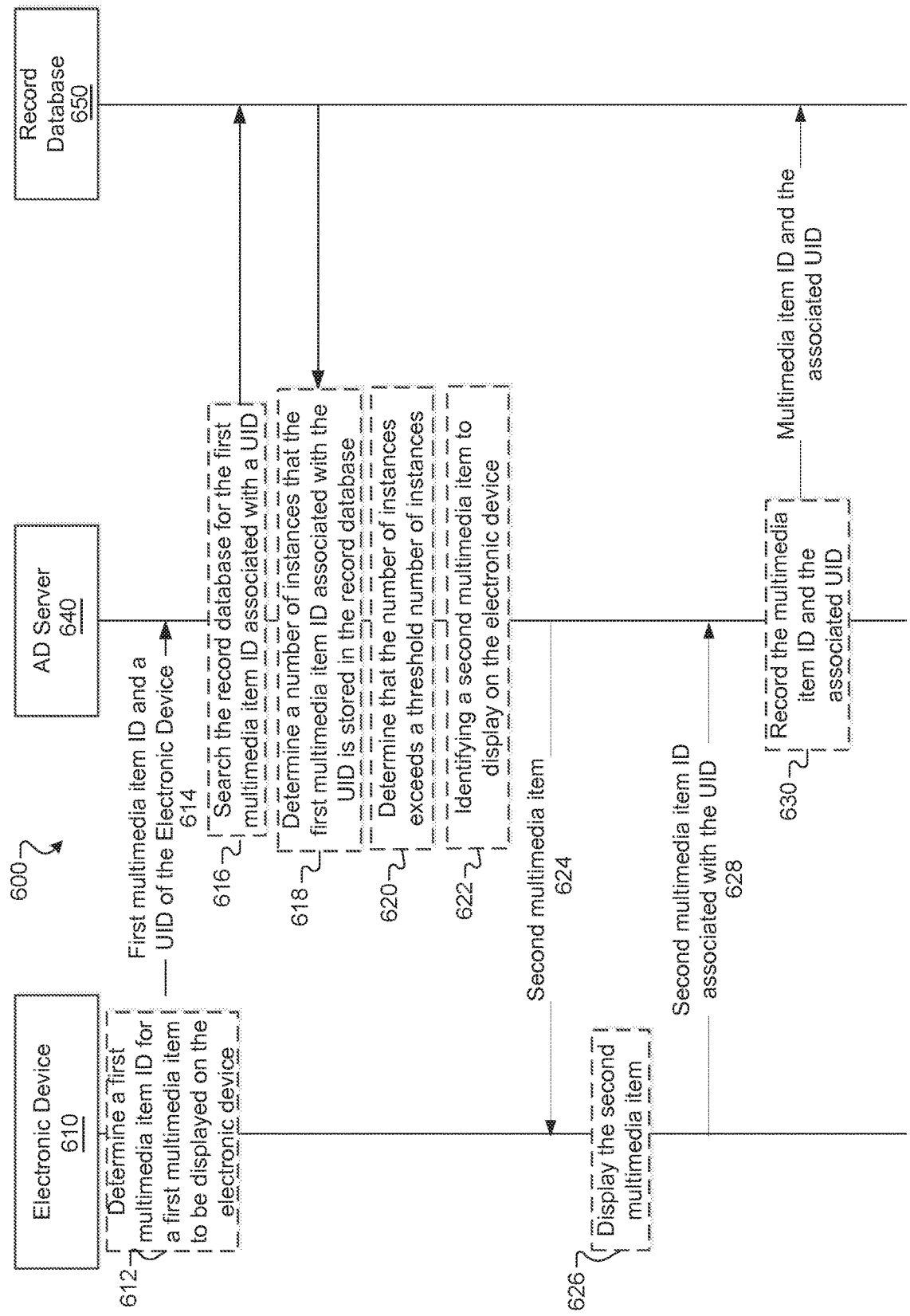
FIG. 6 illustrates a diagram of a method of checking when a multimedia item has previously been displayed on an electronic device according to one embodiment.

FIG. 6 illustrates a diagram of a method 600 of checking when a multimedia item has previously been displayed on an electronic device 610 according to one embodiment. The method 600 may at least partially be performed by processing logic that includes hardware (e.g., circuitry, dedicated logic, programmable logic, microcode, etc.), software (e.g., instructions executed by a processing device), firmware or a combination thereof. The method 600 may be performed by processing logic of the electronic device 210 (illustrated in FIG. 2), the processing logic of the ACR system 220 (illustrated in FIG. 2), or the processing logic of the server 240 (illustrated in FIG. 2).

Referring to FIG. 6, the method 600 begins with determining, by processing logic of the electronic device 610, a first multimedia item ID for a first multimedia item to be displayed on the electronic device 610 (612). The method can also include sending, by the processing logic of the electronic device 610, a message to the AD server 640 (614). The message can include the first multimedia item ID and a UID associated with the electronic device 610. The method can include searching, by the processing logic of the AD server 640, the record database 650 for the first multimedia item ID associated with the UID (616). The method can include determining, by the processing logic of the AD server 640, that a number of instances that the first multimedia item ID associated with the UID is stored in the record database 650 (618). The number of instances associated with the first multimedia item ID and the UID can indicate a number of times the electronic device 610 has displayed the first multimedia item associated with the multimedia item ID. The method can include determining, by the processing logic of the AD server 640, that the number of instances exceeds the threshold number of instances (620). The method can include identifying, by the processing logic of the AD server 640, a second multimedia item to display on the electronic device 610 when the number of instances exceeds the threshold number of instances for the first multimedia item ID (622).

In one embodiment, the identifying the second multimedia item to display can include verifying, by the AD server 640, that a number of instances in the record database 650 for a second multimedia item ID associated the second multimedia item to be display on the electronic device 610 does not exceed a threshold number of instances (624). For example, the record database 650 not including a second multimedia item ID associated with the UID for the second multimedia item can indicate that the electronic device 610 has not previously displayed the second multimedia item.

In another embodiment, when the number of instances in the record database 650 for the second the second multimedia item being displayed on the electronic device 610 exceeds the threshold number of instances, the AD server 640 can iteratively search the record database 650 to identify an nth multimedia item that does not exceed a threshold number of instances. For example, when the threshold number of instance for the second multimedia item is exceeded, the AD server 640 can sequentially search the record database 650 for a multimedia item ID for a third multimedia item in the multimedia content set, a multimedia item ID for a fourth multimedia item in the multimedia content set, a multimedia item ID for a fifth multimedia item in the multimedia content set, and so forth until the AD server 640 identifies a multimedia item ID for an nth multimedia item that does not exceed a threshold number of instance. In this example, the AD server 640 can send the nth multimedia item instead of the second multimedia item.

In one example, when the threshold number of instances has been exceed for each of the n multimedia items, the AD server 640 can send a multimedia item from a different multimedia content set. In this example, the content overlay network 200 can notify a user or administrator that an individual or company associated with the initial multimedia content set should receive a refund for a payment associated with the AD server 640 sending the multimedia items to the electronic device 610 for display. In another example, when the threshold number of instances for each of the multimedia items has been exceeded, the AD server 640 can reset a count for each of the number of instances for the multimedia item IDs associated with the multimedia items displayed on the electronic device 610. When the count has been reset, the AD server 640 can start over in a sequence of showing the multimedia items.

The method can include sending, from the AD server 640, the second multimedia item to the electronic device 610 (624). The method can include displaying the second multimedia item on the electronic device 610 (626). In one example, the electronic device 610 can display the second multimedia item on the electronic device 610 by overlaying or superimposing the second multimedia item over the first multimedia item. The method can include sending, to the AD server 640, a notification that includes the second multimedia item ID and the UID when the second multimedia has been display (628). The method can include incrementing a number of instances for the second multimedia item ID and the associated UID when the notification is received (630). Alternatively, the AD server 640 can increment the number of instances when the AD server 640 sends the second multimedia item to the electronic device 610. The preceding example illustrates displaying the second multimedia item on the electronic device 610. However, this exemplary method is not intended to be limiting. The method 600 can be an iterative method where multiple multimedia items or all of the multimedia items in multimedia content set can be sequentially overlayed over previously displayed multimedia items. Additionally, an order of the multimedia items in multimedia content set can be sequential, random, or any other defined order.

Figure 4:
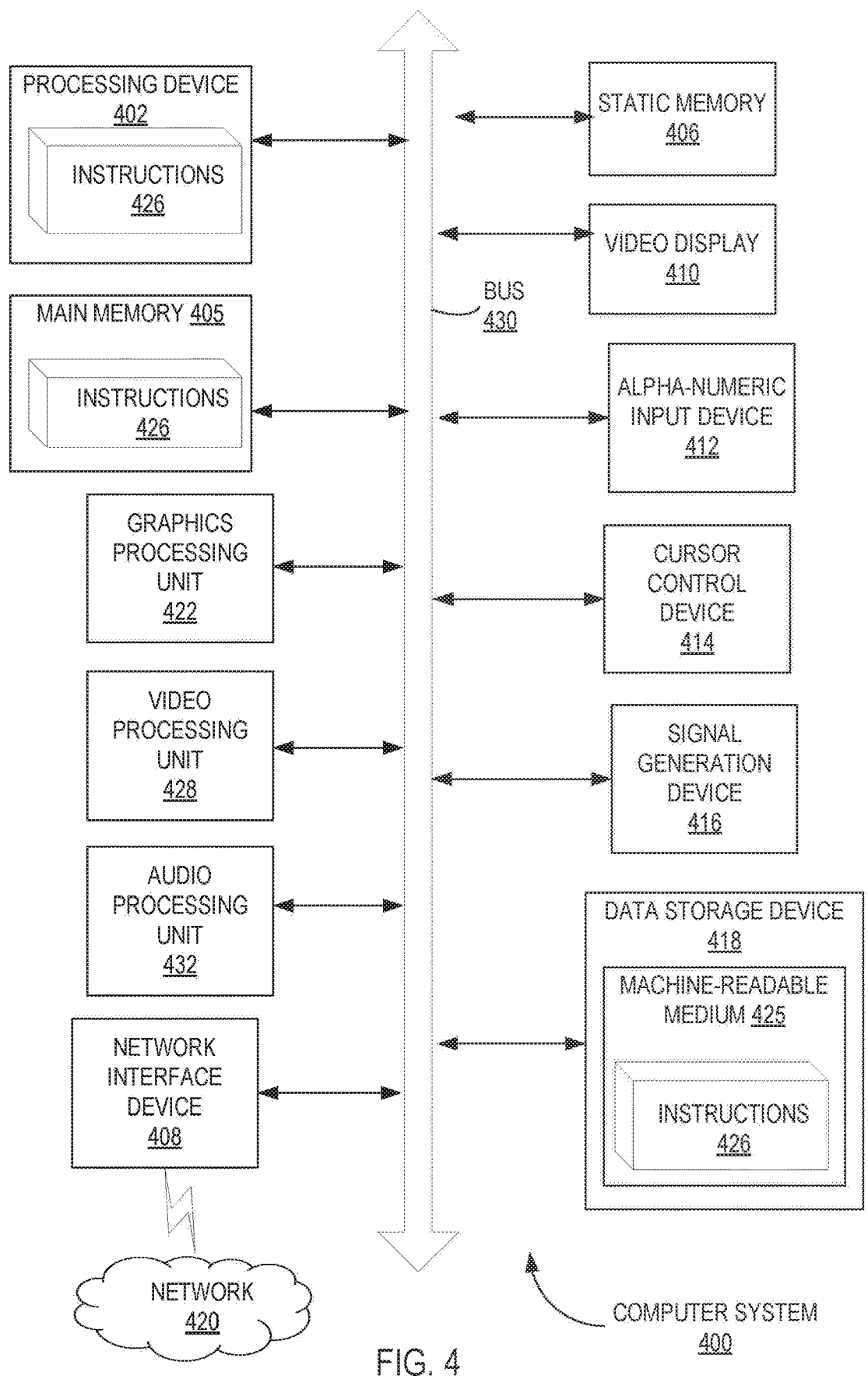
FIG. 4 illustrates a diagrammatic representation of a machine in the example form of a computer system within which a set of instructions, for causing the machine to perform any one or more of the methodologies discussed herein, may be executed.

FIG. 4 illustrates a diagrammatic representation of a machine in the example form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or an electronic device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a smartphone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 400 may correspond to the ACR fingerprinter server 105 of FIG. 1. The computer system 400 may correspond to all or part of the content distribution network 100 of FIG. 1 or to all or part of the content overlay network 200 of FIG. 2. The computer system 400 may correspond to at least a portion of a cloud-based computer system such as discussed herein.

The computer system 400 includes: a processing device 402; a main memory 405, such as a read-only memory (ROM); flash memory; dynamic random access memory (DRAM), such as synchronous DRAM (SDRAM) or DRAM (RDRAM); a static memory 406, such as flash memory or static random access memory (SRAM); and a data storage device 418. The processing device 402, the main memory 405, the flash memory, the dynamic random access memory (DRAM), the static memory 406, and the data storage device 418 can communicate with each other via a bus 430.

Processing device 402 represents one or more processing devices. For example, one or more processing devices can be a microprocessor, central processing unit, or the like. More particularly, the processing device 402 may be a complex instruction set computing (CISC) microprocessor, a reduced instruction set computer (RISC) microprocessor, a very long instruction word (VLIW) microprocessor, a processor implementing other instruction sets, or a processor implementing a combination of instruction sets. The processing device 402 may also be one or more special-purpose processing devices. For example, the special-purpose processing devices can be an application specific integrated circuit (ASIC), a field programmable gate array (FPGA), a digital signal processor (DSP), network processor, or the like. In one embodiment, processing device 402 may include one or more processing cores. The processing device 402 may be configured to execute the instructions 426 of a mirroring logic stored in the main memory 405 for performing the operations discussed herein.

The computer system 400 may further include a network interface device 408 communicably coupled to a network 420. The computer system 400 also may include: a video display unit 410, such as a liquid crystal display (LCD) or a cathode ray tube (CRT); an alphanumeric input device 412, such as a keyboard; a cursor control device 414, such as a mouse; a signal generation device 416, such as a speaker; or other peripheral devices. Furthermore, the computer system 400 may include a graphics processing unit 422, a video processing unit 428, and an audio processing unit 432. In another embodiment, the computer system 400 may include a chipset, which refers to a group of integrated circuits, or chips, that is designed to work with the processing device 402. The chipset may control communications between the processing device 402 and external devices. For example, the chipset may be a set of chips on a motherboard that links the processing device 402 to high-speed devices, such as main memory 405 and graphic controllers, as well as linking the processing device 402 to lower-speed peripheral buses of peripherals, such as a universal serial bus (USB), a peripheral component interconnect (PCI), or industry standard architecture (ISA) buses.

The data storage device 418 may include a computer-readable storage medium 425 that stores instructions 426. The instructions 426 may embody any one or more of the methodologies of functions described herein. The instructions 426 may also reside, completely or at least partially, within the main memory 405 and/or within the processing device 402 during execution thereof by the computer system 400. The main memory 405 and the processing device 402 may be computer-readable storage media.

The computer-readable storage medium 425 may store instructions 426 utilizing logic and/or a software library containing methods that call the above applications. While the computer-readable storage medium 425 is shown in an example embodiment to be a single medium, the term "computer-readable storage medium" or "computer-readable medium" is not intended to be limiting. The "computer-readable storage medium" or "computer-readable medium" can be a single medium or multiple media, such as a centralized or distributed database, and/or associated caches and servers, that store the one or more sets of instructions. The term "computer-readable storage medium" can include any medium that is capable of storing, encoding or carrying a set of instruction for execution by the machine and that cause the machine to perform any one or more of the methodologies of the present embodiments. The term "computer-readable storage medium" can include, but not be limited to, solid-state memories, optical media, and magnetic media.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Although the embodiments may be herein described with reference to specific integrated circuits, such as in computing platforms or microprocessors, other embodiments are applicable to other types of integrated circuits and logic devices. Similar techniques and teachings of embodiments described herein may be applied to other types of circuits or semiconductor devices. For example, the disclosed embodiments are not limited to desktop computer systems or laptops and may also be used in other devices, such as handheld devices, tablets, other thin notebooks, systems on a chip (SOC) devices, and embedded applications. Some examples of handheld devices include cellular phones, Internet protocol (IP) devices, smartphones, digital cameras, personal digital assistants (PDAs), and handheld personal computers (PCs). Embedded applications can include microcontrollers, digital signal processors (DSPs), SoCs, network computers (NetPC), set-top boxes, network hubs, wide area network (WAN) switches, or other systems that may perform the functions and operations, as discussed in the proceeding paragraphs.

Although the embodiments described herein may refer to a processor or processing device, other embodiments are applicable to other types of integrated circuits and logic devices. Similar techniques and teachings of embodiments may be applied to other types of circuits or semiconductor devices that may benefit from higher pipeline throughput and improved performance. The embodiments herein are applicable to any processor or machine that performs data manipulations. However, the embodiments are not limited to processors or machines that perform 512 bit, 256 bit, 128 bit, 64 bit, 32 bit, and/or 16 bit data operations and may be applied to any processor and machine in which manipulation or management of data is performed.

The embodiments herein provide examples, and the accompanying drawings show various examples for the purposes of illustration. However, these examples should not be construed to be limiting, as they are merely intended to provide examples of embodiments rather than to provide an exhaustive list of all possible implementations of embodiments.

Some portions of the detailed description are presented in terms of algorithms and symbolic representations of operations on data bits within a computer memory. These algorithmic descriptions and representations are used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein may be hardware, software, firmware, or a combination thereof.

The terms in the preceding paragraphs and similar terms are to be associated with the appropriate physical quantities and are merely convenient labels applied to these quantities. Unless specifically stated otherwise as apparent from the preceding paragraphs and figures, discussions utilizing terms such as "detecting," "initiating," "determining," "continuing," "halting," "receiving," "recording," or the like, refer to the actions and processes of a computing system, or similar electronic computing device, that manipulates and transforms data represented as physical (e.g., electronic) quantities within the computing system registers and memories into other data similarly represented as physical quantities within the computing system memories, computer system registers, other information storage devices, other transmission devices, or electronic devices.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

Embodiments described herein may also relate to an apparatus for performing the operations herein. This apparatus may be specially constructed for the required purposes, or it may comprise a computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMS), erasable programmable read only memories (EPROMs), electrically erasable programmable read only memories (EEPROMs), magnetic or optical cards, flash memory, or any type of media suitable for storing electronic instructions. The term "computer-readable storage medium" can include a single medium or multiple mediums that store the one or more sets of instructions. The single medium or multiple mediums can be centralized or distributed databases and/or associated caches and servers. The term "computer-readable medium" can include any medium that is capable of storing, encoding or carrying a set of instructions for execution by the machine and that causes the machine to perform any one or more of the methodologies of the embodiments herein. The term "computer-readable storage medium" can include, but not be limited to, solid-state memories, optical media, magnetic media, or any medium that is capable of storing a set of instructions for execution by the machine and that causes the machine to perform any one or more of the methodologies of the embodiments herein.

The algorithms and displays presented herein are not inherently related to any particular computer or other apparatus. Various computing systems may be used with programs in accordance with the teachings herein, or it may prove convenient to construct a more specialized apparatus to perform the operations. The required structure for a variety of these systems will appear from the description in the proceeding paragraphs. In addition, the embodiments herein are not described with reference to any particular programming language. It will be appreciated that a variety of programming languages may be used to implement the teachings of the embodiments herein.

The preceding description sets forth numerous specific details such as examples of specific systems, components, methods and so forth, in order to provide a good understanding of several embodiments. It will be apparent to one skilled in the art, however, that at least some embodiments may be practiced without these specific details. In other instances, well-known components or methods are not described in detail or are presented in simple block diagram format in order to avoid unnecessarily obscuring the embodiments herein. Thus, the specific details set forth above are merely exemplary. Particular implementations may vary from these exemplary details and still be contemplated to be within the scope of the present embodiments.

The preceding description is illustrative and not restrictive. Many other embodiments will be apparent to those of skill in the art upon reading and understanding the preceding description. The scope of the embodiments herein should be determined with reference to the appended claims, along with the full scope of equivalents to which such claims are entitled.

What is claimed is:

1. A system for managing content displayed by an electronic device, comprising:
    a processing device; and
    a non-transitory computer-readable storage medium in communication with the processing device, the non-transitory computer-readable storage medium storing instructions that when executed on the processing device cause the processing device to perform operations including:
        receiving information indicating a scheduled content item to be displayed by the electronic device at a scheduled time;
        performing a sequential search of a record database, the record database storing records relating to a set of content items, the records including respective display counts indicating a number of times that each content item has been displayed by the electronic device, the respective display count for each content item being associated with a respective threshold criterion;
        during the sequential search of the record database, identifying a replacement content item from the set of content items,
        wherein the replacement content item has a respective display count that satisfies the respective threshold criterion associated with the respective display count for the replacement content item,
        the respective display count for the replacement content item indicates that the replacement content item has been displayed for more than one instance by the electronic device,
        the replacement content item is a $n^{th}$ content item in the set of content items, and
        for each of first through $(n-1)^{th}$ content items from the set of content items, the respective display count for the content item does not satisfy the respective threshold criterion associated with the respective display count for the content item; and
        causing the electronic device to display the replacement content item at the scheduled time to replace the scheduled content item.

2. The system of claim 1, wherein the operations performed by the processing device further include updating, in the record database, the display count for the replacement content item responsive to the electronic device displaying the replacement content item.

3. The system of claim 1, wherein the respective threshold criterion associated with the respective display count for each content item is based on at least one of demographic information relating to a viewer of the scheduled content item, or on a time of day.

4. The system of claim 1, wherein the operations performed by the processing device further include determining, via the electronic device, a behavior from a viewer while the electronic device displays content, and the replacement content item is further identified from the set of content segment items according to the behavior.

5. The system of claim 1, wherein the respective display counts for the first through $(n-1)^{th}$ content items indicate that each of the first through $(n-1)^{th}$ content items has been displayed by the electronic device for more than one instance.

6. The system of claim 1, wherein the scheduled content item is one of the first through $(n-1)^{th}$ content items from the set of content items.

7. A system for managing content displayed by an electronic device, comprising:
    a content server configured to store, on a first data storage device, a set of content items;
    a record database system configured to store, on a second data storage device, records relating to the set of content items, the records including respective display counts indicating a number of times that each content item has been displayed by the electronic device, the respective display count for each content item being associated with a respective threshold criterion; and
    a content management system including a processing device and a non-transitory computer-readable storage medium, the non-transitory computer-readable storage medium storing instructions that when executed on the processing device cause the processing device to perform operations including:
        receiving information indicating a scheduled content item to be displayed by the electronic device at a scheduled time;
        performing a sequential search of the record database;
        during the sequential search of the record database, identifying a replacement content item from the set of content items,
        wherein the replacement content item has a respective display count that satisfies the respective threshold criterion associated with the respective display count for the replacement content item,
        the respective display count for the replacement content item indicates that the replacement content item has been displayed for more than one instance by the electronic device,
        the replacement content item is a $n^{th}$ content item in the set of content items, and
        for each of first through $(n-1)^{th}$ content items from the set of content items, the respective display count for the content item does not satisfy the respective threshold criterion associated with the respective display count for the content item; and
        causing the electronic device to display the replacement content item at the scheduled time to replace the scheduled content item.

8. The system of claim 7, further comprising an automatic content recognition system configured to identify the scheduled content item to be displayed by the electronic device, and the processing device receives, from the automatic content recognition system, the information indicating the scheduled content item to be displayed by the electronic device at the scheduled time.

9. The system of claim 7, wherein the operations performed by the processing device further include updating, in the record database, the respective display count for the replacement content item responsive to the electronic device displaying the replacement content item.

10. The system of claim 7, wherein the respective threshold criterion associated with the respective display count for each content item is based on at least one of demographic information relating to a viewer of the scheduled content item, or on a time of day.

11. The system of claim 7, wherein the operations performed by the processing device further include determining, via the electronic device, a behavior from a viewer while the electronic device displays content, and the replacement content item is further identified from the set of content segment items according to the behavior.

12. The system of claim 7, wherein the respective display counts for the first through $(n-1)^{th}$ content items indicate that each of the first through $(n-1)^{th}$ content items has been displayed by the electronic device for more than one instance.

13. The system of claim 7, wherein the scheduled content item is one of the first through $(n-1)^{th}$ content items from the set of content items.

14. A method for managing content displayed by an electronic device, comprising:
receiving information indicating a scheduled content item to be displayed by the electronic device at a scheduled time;
performing a sequential search of a record database, the record database storing records relating to a set of content items, the records including respective display counts indicating a number of times that each content item has been displayed by the electronic device, the respective display count for each content item being associated with a respective threshold criterion;
during the sequential search of the record database, identifying a replacement content item from the set of content items,
wherein the replacement content item has a respective display count that satisfies the respective threshold criterion associated with the respective display count for the replacement content item,
the respective display count for the replacement content item indicates that the replacement content item has been displayed for more than one instance by the electronic device,
the replacement content item is a $n^{th}$ content item in the set of content items, and
for each of first through $(n-1)^{th}$ content items from the set of content items, the respective display count for the content item does not satisfy the respective threshold criterion associated with the respective display count for the content item; and
causing the electronic device to display the replacement content item at the scheduled time to replace the scheduled content item.

15. The method of claim 14, further comprising updating, in the record database, the display count for the replacement content item responsive to the electronic device displaying the replacement content item.

16. The method of claim 14, wherein the respective threshold criterion associated with the respective display count for each content item is based on at least one of demographic information relating to a viewer of the scheduled content item, or on a time of day.

17. The method of claim 14, further comprising determining, via the electronic device, a behavior from a viewer while the electronic device displays content, and the replacement content item is identified from the set of content segment items according to the behavior.

18. The method of claim 14, wherein the respective display counts for the first through $(n-1)^{th}$ content items indicate that each of the first through $(n-1)^{th}$ content items has been displayed by the electronic device for more than one instance.

19. The method of claim 14, wherein the scheduled content item is one of the first through $(n-1)^{th}$ content items from the set of content items.

* * * * *